March 23, 1926.  
R. F. MILLER  
KEY HOLDING ATTACHMENT FOR BELTS  
Filed June 17, 1925

1,578,157

Robert F. Miller
INVENTOR

BY Victor J. Evans
ATTORNEY

WITNESS: Gerald Hennen

Patented Mar. 23, 1926.

1,578,157

UNITED STATES PATENT OFFICE.

ROBERT F. MILLER, OF FITZPATRICK, WEST VIRGINIA.

KEY-HOLDING ATTACHMENT FOR BELTS.

Application filed June 17, 1925. Serial No. 37,810.

*To all whom it may concern:*

Be it known that I, ROBERT F. MILLER, a citizen of the United States, residing at Fitzpatrick, in the county of Raleigh and State of West Virginia, have invented new and useful Improvements in Key-Holding Attachments for Belts, of which the following is a specification.

An object of the invention resides in the provision of a key ring holder designed to be supported upon a belt or the like, and made up of two parts which permits the holder to be manufactured and sold at a nominal cost, the invention residing in the construction, combination and arrangement of parts to be hereinafter claimed.

In the drawing forming part of this application like numerals of reference indicate similar parts in the several views, and wherein.

Figure 1:
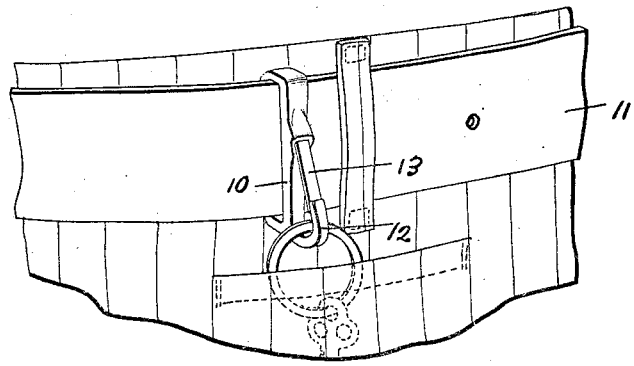
Figure 1 is a view showing the application of the invention.
Figure 2:
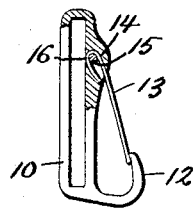
Figure 2 is a side elevation of the holder partly in section.
Figure 3:
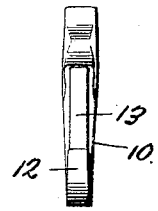
Figure 3 is a view taken at a right angle to Figure 2.

The article forming the subject matter of the present invention embodies a closed loop 10 through which an ordinary belt 11 is adapted to pass, while projecting from one end of the loop and to one side thereof is a hook like portion 12. This element just described is formed in one piece, while the other part of the invention consists of a spring 13 adapted to be supported upon the loop 10 and having its free end normally contacting the hook portion 12 as shown in Figure 2. One side of the loop is formed to provide a hollow projection 14 in which is arranged a transverse pin 15, the projection being adapted to receive the adjacent end of the spring 13 which is folded upon itself about the pin 15 as clearly shown in Figure 2, the folded portion of the spring being indicated at 16. By reason of this construction the entire article can be cheaply manufactured and sold and when supported upon the belt 11 can be conveniently used for the purpose intended.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A key ring holder comprising a closed loop, a hook like portion projecting from one end thereof, and arranged at one side of the loop, a hollow projection extending from one side of the loop, a transverse pin arranged within the projection, a leaf spring having one end received by the projection and folded about said pin, the other end of the spring normally engaging the hook like portion for the purpose specified.

In testimony whereof I affix my signature.

ROBERT F. MILLER.